United States Patent [19]

Huang et al.

[11] 3,717,671
[45] Feb. 20, 1973

[54] XYLYLENE DICARBAMATES AND PROCESS FOR PREPARING THE SAME

[75] Inventors: Ching Yun Huang; Tomotaka Onizuka, both of Osaka; Tamotsu Maeno, Yokohama; Teruyuki; Ninomiya, Osaka, all of Japan

[73] Assignee: Japan Gas-Chemical Company, Inc., Tokyo, Japan

[22] Filed: April 6, 1970

[21] Appl. No.: 26,104

[52] U.S. Cl.........260/482 B, 117/140 A, 117/155 L, 260/78 R, 260/482 C
[51] Int. Cl............................................C07c 125/04
[58] Field of Search......................260/482 C, 482 B

[56] References Cited

UNITED STATES PATENTS 2,934,559    4/1960    Beinfort et al...................260/482 B

FOREIGN PATENTS OR APPLICATIONS 839,408    6/1960    Great Britain........................260/482

Primary Examiner—Lorraine A. Weinberger
Assistant Examiner—Paul J. Killos
Attorney—Sherman and Shalloway

[57] ABSTRACT

Novel xylylene dicarbamate and nucleus-substituted derivatives thereof expressed by the following formula

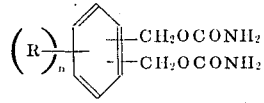

wherein R stand for an alkyl group of one to four carbon atoms and $n$ is O or an integer of 1 to 4, and a process for the preparation of said xylylene dicarbamates.

11 Claims, No Drawings

XYLYLENE DICARBAMATES AND PROCESS FOR PREPARING THE SAME

This invention relates to xylylene dicarbamates and a process for the preparation of the same. More specifically, it relates to novel xylylene dicarbamate and nucleus-substituted derivatives thereof expressed by the following formula

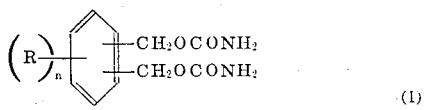
(I)

wherein R stands for an alkyl group of one to four carbon atoms and $n$ is 0 or an integer of 1 to 4, and a process for the preparation of said dicarbamate derivatives.

As processes for preparing esters of carbamic acid the following have been known (1) a process comprising a reaction of an alcohol with urea, (2) a process comprising subjecting an alcohol to an ester-exchange reaction with a lower alkyl ester of carbamic acid and (3) a process comprising a reaction of an alcohol with phosgene to form an ester of chloroformic acid and a reaction of the ester with ammonia. Esters of dicarbamic acid can be optionally prepared from glycols in accordance with the above-mentioned processes. Further, a process has been known for the preparation of benzyl carbamates having an aromatic nucleus in the molecule by a reaction of a benzyl alcohol with urea.

However, no process has been known for the preparation of xylylene dicarbamates from xylylene glycols. Unlike aliphatic glycols, xylylene glycols have a tendency to cause self-condensation quite easily even under a weakly acidic condition and further, at elevated temperatures tend to turn into polyethers. Such properties are prominent particularly in xylylene glycols which have an alkyl substituent in the aromatic nucleus.

Still further, xylylene glycols have an extremely high boiling point as compared with aliphatic glycols. Because of such high boiling point and the above-mentioned tendency toward self-condensation at elevated temperatures, xylylene glycols cannot be distilled by conventional means adopted in laboratories or industries.

In the conventional process for the preparation of alkyl carbamates, an alcohol is generally used in excess based on urea, and the excessive alcohol can be recovered by distillation after completion of the reaction. As the grate of the reaction between an alcohol and urea is low, the operation above-mentioned is usually conducted in the presence of an excess of one of the reactants in order to accelerate the reaction and prevent urea from being converted into cyanuric acid as a by-product. However, in the case of xylylene glycols it is impossible because of the above-mentioned properties of xylylene glycols to use them in excess based on the urea and distill unchanged glycols after completion of the reaction. It is known that in the process for preparing benzyl carbamate from benzyl alcohol and urea, the reaction is conducted at a high temperature such as 170°–180°C in the presence of an acidic catalyst such as sulfuric acid, phosphoric acid and aluminum chloride [Kogyo Kagaku Zasshi, vol. 66, page 514 (1963)]. In view of the characteristic properties of xylylene glycols it is apparent that xylylene dicarbamates cannot be prepared by such process adopted in the case of benzyl carbamate.

It has now been found that novel xylylene dicarbamates can be obtained by reacting a xylylene glycol with urea or a lower alkyl carbamate under specific conditions.

In accordance with this invention, a process is provided for the preparation of xylylene dicarbamates expressed by the formula

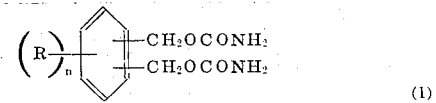
(I)

wherein R stands for an alkyl group of one to four carbon atoms and $n$ is 0 or an integer of 1 to 4, which comprises reacting a xylylene glycol expressed by the formula

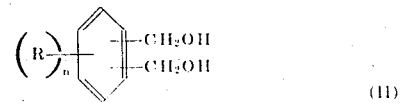
(II)

wherein R and $n$ are as defined above, with urea at a temperature of 135° to 160°C.

In accordance with this invention, a process is further provided for the preparation of xylylene dicarbamates expressed by the formula

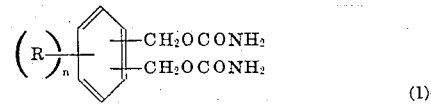
(I)

wherein R stands for an alkyl group of one to four carbon atoms and $n$ is 0 or an integer of 1 to 4, which comprises reacting a xylylene glycol expressed by the formula

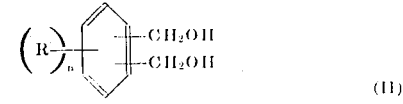
(II)

wherein R and $n$ as defined above, with an ester of carbamic acid expressed by the formula

wherein R' stands for an alkyl group of one to four carbon atoms, at a temperature of 120° to 18°C.

The xylylene glycol to be used as one of the starting materials in this invention is expressed by the following general formula

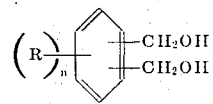

wherein R stands for an alkyl group of one to four carbon atoms and $n$ is 0 or an integer of 1 to 4, and when the group (R)$_n$ contains a plurality of R's, they may be the same or different.

Specific examples of such xylylene glycol are o-xylylene glycol, m-xylylene glycol, p-xylylene glycol and xylylene glycols which have an alkyl substituent in the aromatic nucleus, such as 4-methyl-m-xylylene glycol, 4-ethyl-m-xylylene glycol, 4-isopropyl-m-xylylene glycol, 4-tert.-butyl-m-xylylene glycol, 4,5-dimethyl-o-xylylene glycol, 4,6-dimethyl-m-xylylene glycol, 2,5-dimethyl-p-xylylene glycol, 2,4,6-trimethyl-m-xylylene glycol, 2,4,5-trimethyl-m-xylylene glycol and 2,3,5,6-tetramethyl-p-xylylene glycol.

In the first process of this invention wherein urea is used as the other starting material, it is sufficient to use urea in a stoichiometric amount based on the above-mentioned xylylene glycol, namely in an amount of about 2 moles per mole of the xylylene glycol. Of course, it is possible to use urea in an amount greater than the stoichiometric amount. In case urea is used in an excessive amount based on the xylylene glycol, the unchanged urea can be easily separated from the reaction product by the method of separation and purification which may be detailed hereinbelow. Accordingly, the use of an excessive amount of urea does not cause any disadvantages. In this invention it is generally desired to use urea in an amount of 2 to 3 moles per mole of the xylylene glycol.

In conducting the first process of this invention special attention must be paid to the reaction temperature and the separation and purification of the reaction product in order that the reaction between the xylylene glycol and urea may be advanced smoothly and that a xylylene dicarbamate may be obtained in high purity. More specifically, the temperature range is very critical in the reaction of the xylylene glycol with urea, and the reaction must be effected at 135° to 160°C, preferably 140° to 155°C. At a temperature lower than 135°C, the reaction rate is too low and the intended xylylene dicarbamate is hardly formed, though a xylylene glycol monocarbamate can be obtained. On the other hand, at a temperature higher than 160°C, a resinous product is readily formed and its separation from the intended product is difficult, with the result that the yield of intended product is lowered. In short, the reaction is allowed to progress conveniently at a temperature within the limited range of 135° to 160°C.

At a temperature of the above-mentioned range the reaction is allowed to advance sufficiently even in the absence of a catalyst. It is possible to use a catalyst so as to perform the reaction more efficiently. As the catalyst, catalysts ordinarily used for the reaction of preparing carbamates from alcohols and urea may be used, except those which are acidic. The use of an acidic catalyst such as sulfuric acid and phosphoric acid is not suitable for attaining the object of this invention, because such acidic catalyst causes polycondensation of the xylylene glycol. Catalysts to be used particularly preferably for the object of this invention include carboxylic acid salts of metals such as zinc and lead, e.g., acetates of such metals; stannic and stannous chlorides; and organotin compounds.

As the organotin compound, tin compounds expressed by the following formulae

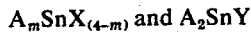

wherein A stands for an alkyl or alkoxy group, X is a halogen atom, a thioalkoxy or hydroxyl group, or a carboxylic acid residue, Y stands for an oxygen or sulfur atom and $m$ is 1, 2 or 3 are generally used.

Specific examples of the organotin compound are tri-n-butyl tin acetate, di-n-butyl tin diacetate, di-n-butyl tin dilaurate, di-n-butyl tin dilauryl mercaptide, dimethyl tin dichloride, di-n-butyl tin dichloride, di-n-butyl tin sulfide, bis(2-ethylhexyl) tin oxide, 2-ethylhexyl stannic acid and trimethyl tin hydroxide.

These catalysts are used in amount generally employed for preparation of carbamates, e.g., 0.5 to 10 percent by weight, preferably 1 to 6 percent by weight, based on the xylylene glycol.

The reaction may be effected in the absence of a solvent, that is, in the molten state of urea and the xylylene glycol. It is also possible to conduct the reaction in an inert organic solvent such as trichlorobenzene.

The reaction is allowed to advance sufficiently under atmospheric pressure, but it may be preferable that the reaction is carried out under somewhat reduced pressure since ammonia is liberated from the reaction medium, and furthermore, no particular disadvantage is caused in the reaction under somewhat elevated pressure. The reaction time of 10 hours or more is sufficient.

The reaction mixture obtained by the reaction conducted under the above-mentioned conditions contains a xylylene glycol monocarbamate, the unchanged xylylene glycol and urea, a small amount of a resinous byproduct and the catalyst optionally used in addition to the intended xylylene dicarbamate.

Although the intended xylylene dicarbamate may be separated from such reaction mixture by conventional techniques other than distillation, e.g., by recrystallization, extraction or the like, it is impossible to obtain the intended product of a high purity by such conventional techniques.

It has now been found that when the reaction mixture obtained in the above-mentioned first process is treated with an aromatic hydrocarbon having six to nine (inclusive) carbon atoms, the unchanged xylylene glycol, the xylylene glycol monocarbamate, the catalyst residue and the like are dissolved in the aromatic hydrocarbon and that when the reaction mixture undissolved in aromatic hydrocarbon is further treated with nitrobenzen, the substances other than urea are dissolved in nitrobenzene and the intended xylylene dicarbamate can be recovered in high purity from the nitrobenzene solution.

Thus, in accordance with this invention, a process for recovering a xylylene dicarbamate of a high purity from the above-mentioned reaction mixture is also provided. This purification process will now be detailed by referring to a crude reaction mixture obtained by employing an organotin compound as the catalyst. First the crude reaction mixture is treated with a hot aromatic hydrocarbon having 6 to nine carbon atoms. The intended xylylene dicarbamate, the unchanged urea and a resinous by-product are insoluble in the hot aromatic hydrocarbon, while the xylene glycol monocarbamate, by-product the unchanged xylylene glycol and the organotin compound used as the catalyst are soluble in the hot aromatic hydrocarbon. Thus, they are separated easily by filtration. As the aromatic hydrocarbon having six to nine carbon atoms to be used for this purpose, benzene, toluene, xylene, ethyl benzene, cumene, pseudocumene, mesitylene and the like may be cited. In the treatment of the reaction mixture with the above-mentioned aromatic hydrocarbon, it is essential that the treatment temperature should not be lower than 70° C. When the aromatic hydrocarbon is distilled off from the filtrate, a mixture remains comprising the xylylene glycol monocarbamate which is an intermediate of the intended xylylene dicarbamate, the unchanged starting xylylene glycol and the catalyst. This mixture may be recycled to the reaction and used as a part of the starting materials.

The filtration residue comprising the intended xylylene dicarbamate, the unchanged urea and a resinous by-product is treated with nitrobenzene. Since urea is insoluble in nitrobenzene even at elevated temperatures, the unchanged urea can be separated from the filtration residue by adding thereto nitrobenzene, heating the mixture and subjecting it to filtration. It is preferable that this treatment of nitrobenzene is effected at a temperature of 100° to 140°C. When the nitrobenzene solution obtained after separation of urea is allowed to cool, the xylylene dicarbamate is precipitated as crystals. The xylylene dicarbamate is hardly soluble in nitrobenzene at low-temperatures, while the resinous product is easily soluble in nitrobenzene even at those temperatures. Accordingly, the intended product precipitated as crystals can be easily recovered by filtration. The formation of crystals of the intended product may be efficiently accomplished only by cooling the nitrobenzene solution to room temperature, and it is unnecessary to lower the temperature below room temperature by ice cooling or the like. Nitrobenzene can be easily recovered by distillation from the filtrate obtained after separation of the intended xylylene dicarbamate.

In the above-mentioned process of separation and purification, if the catalyst used in the reaction is insoluble in the hot aromatic hydrocarbon, it may be separated in the treatment with nitrobenzene, and furthermore if the catalyst is soluble in nitrobenzene, it may be separated when the precipitated product by cooling is filtered from the nitrobenzene solution. The product separated by the above-mentioned process has a sufficiently high purity, but if necessary, it may be further purified by means of purification methods described below.

In accordance with the second process of this invention, a xylylene glycol expressed by the above-mentioned formula (II) is allowed to react with a lower alkyl ester of carbamic acid expressed by the above-mentioned formula (III) at a temperature of 120° to 180°C.

As the lower alkyl ester of carbamic acid, alkyl esters of the formula $NH_2COOR'$ (in which $R'$ is an alkyl group of one to four, carbon atoms), such as methyl carbamate, ethyl carbamate, n-propyl carbamate, iso-propyl carbamate, n-butyl carbamate and isobutyl carbamate may be named. It is sufficient to use the lower alkyl ester of cabamic acid in an amount of 2 moles per mole of the xylylene glycol, but it is permissible to use the ester in an excessive amount. However, the use of the ester in an extremely excessive amount is not preferred because in such case it is necessary to increase the amount of the solvent. Accordingly, it is desired to use the ester in an amount of at most 3 moles per mole of the xylylene glycol.

In conducting the second process of this invention special attentions must be paid to reaction conditions, particularly the reaction temperature. More specifically, the reaction of the xylylene glycol with a lower alkyl ester of carbamic acid is effected at a temperature of 120° to 180°C, preferably 130° to 170°C, since at a temperature lower than 120°C, the rate of the reaction is extremely low regardless of the class and amount of the catalyst, and only a xylylene glycol monocarbamate is obtained as the reaction product, and on the other hand, at a temperature higher than 180°C, formation of a resinous byproduct is extreme and the yield of the intended xylylene dicarbamate is lowered. Accordingly, in conducting the second process of this invention it is also possible to carry out the reaction at two stages where a xylylene glycol monocarbamate is preliminarily formed at a temperature lower than 120°C, and then it is heated to a temperature of 120° to 180°C to form the intended xylylene dicarbamate.

In accordance with the above-mentioned second process of this invention, the intended xylylene dicarbamate can be formed even without use of a catalyst only by carrying out the reaction at temperatures within the above-mentioned range. It is, however, generally preferable to use a catalyst for the purpose of accelerating the reaction. The reaction of the second process of this invention is an ester-exchange reaction. Accordingly, among conventional ester-exchange catalysts are chosen those which are not acidic. As such catalyst, aluminum alkoxides and tetralkyl titanates may be cited, the latter being especially preferred. Further, it has been found that since these catalysts are soluble in various solvents which will be described below, when they are used in combination with these solvents, the intended xylylene dicarbamate can be isolated without containing the catalyst only by subjecting the reaction mixture to filtration. Compounds of other metals known as the catalysts for the ester-exchange reaction are soluble partially or not at all in these solvents. Accordingly, one of features of this invention resides in the discovery that such characteristic property of these catalysts can be utilized conveniently.

Preferable examples of the tetralkyl titanate to be used in this invention are tetra-iso-propyl titanate, tetrabutyl titanate, tetra-2-ethylhexyl titanate and tetrastearyl titanate. As the aluminum alkoxide, aluminum ethoxide and aluminum iso-propoxide may be cited. The amount of the catalyst to be used is 0.1 to 5 percent by weight, preferably 0.5 to 3 percent by weight, based on the xylylene glycol.

In the second process of this invention it is preferable to use a solvent. Since a lower alkyl ester of carbamic acid, one of the starting materials, is molten at a reaction temperature within the above-mentioned range and acts as a suitable solvent, the second process of this invention can be carried out even without using any solvent. However, since the intended xylylene dicarbamate is precipitated as a crystal in the reaction medium, it is preferable to use a solvent, whereby the uniform dispersion of the reactants and catalyst can be attained, the partial heating can be prevented and the separation of the intended product can be accomplished conveniently. It is desired that solvents used in the second process of this invention have no active hydrogen atom in the molecule, have a boiling point under atmospheric pressure of more than 115°C so that the reaction temperature may be maintained above 120°C and are able to dissolve xylylene glycols and lower alkyl esters of carbamic acid at least at reaction temperatures mentioned above. As the solvent meeting the above requirements, aromatic hydrocarbons having a boiling point higher than 115°C, such as ethyl benzene, mixed xylene, o-, m- and p-xylenes, mesitylene, pseudocumene, iso-propyl benzene and p-cymene; chlorobenzene derivatives such as monochlorobenzene, o-, m- and p-dichlorobenzenes, and 1,2,3- and 1,2,4-trichlorobenzenes; and alkoxy benzene derivatibes such as anisol and phenetole may be named. It is sufficient in principle to use the solvent in an amount such that the starting mixture may be kept homogeneous at initiation of the reaction and the unchanged reactants, intermediate and catalyst may be dissolved therein at elevated temperatures at completion of the reaction. Generally, the solvent is used in an amount of 0.3 to 1.0 liter per mole of the starting xylylene glycol.

It has been found that these solvents can dissolve not only the unchanged starting materials but also an intermediate product, namely, a xylylene glycol monocarbamate at elevated temperatures and that they can further dissolve the above-mentioned catalysts. Accordingly, if the reaction is effected with the use of such solvents and the filtration is carried out at elevated temperature after completion of the reaction, it is possible to recover only the intended xylylene dicarbamate. Since both the unchanged xylylene glycol and the intermediate xylylene glycol monocarbamate have an extremely high boiling point, it is almost impossible to remove these impurities by distillation, whereby the intended product in the reaction mixture is likely to undergo thermal decomposition. The filtrate obtained from separation of the intended product which contains the unchanged starting materials, the intermediate product and the catalyst, can be recycled to the reaction as it is. Accordingly, the starting materials and catalyst can be utilized efficiently.

Accordingly, the process of this invention in which xylylene dicarbamates of a high purity can be recovered by a simple filtration technique with the use of the above-mentioned solvents is a process which can be worked industrially conveniently.

As described above, xylylene dicarbamates prepared according to this invention are of a high purity, and they are usually used for various purposes as they are recovered. If further purification is required, it is possible to adopt the following methods as embodiments of purification. Namely, one of the embodiments of purification in this invention is a fractional precipitation method which comprises using a combination of a good solvent and a poor solvent for the xylylene dicarbamates. The former is a polar organic solvent, such as methanol, ethanol, dioxane, tetrahydrofuran, acetone, dimethyl formamide and N-methyl-2-pyrolidone, wherein the xylylene dicarbamates are easily soluble and the latter is water or an aromatic hydrocarbon wherein the xylylene dicarbamates are almost insoluble, and they must be miscible with each other. In this method, the purification can be accomplished by dissolving the crude xylylene dicarbamates in its good solvent mentioned above and then adding the poor solvent to the solution to thereby precipitate the intended product fractionally. The other embodiment of purification in this invention is a recrystalization method wherein a polar organic solvent such as n-butanol and nitrobenzene may be used.

Thus, in accordance with this invention, novel xylylene dicarbamates expressed by the above-mentioned general formula (I) are provided. These novel xylylene dicarbamates have a structural characteristic that they contain an aromatic nucleus in the molecule and have two carbamate groups bonded to the aromatic nucleus. Accordingly, various high molecular weight polymers can be synthesized from novel xylylene carbamates of this invention by utilizing the stability inherent to the aromatic nucleus and the two functional carbamate groups in the molecule. More specifically, they can be used as chain-extenders in the preparation of polyurethanes and as hardening agents for epoxy resins. Further, the methylol compounds derived from the reaction of the xylylene dicarbamates with formaldehyde may be used as raw materials for adhesives, laminates, molding materials or fiber- and paper-treating agents.

Examples of the xylylene dicarbamate prepared in accordance with this invention are as follows:
o-, m- and p-xylylene dicarbamates,
4-methyl-m-xylylene dicarbamate,
4-ethyl-m-xylylene dicarbamate,
4-iso-propyl-m-xylylene dicarbamate,
4-tert.-butyl-m-xylylene dicarbamate,
4,5-dimethyl-o-xylylene dicarbamate,
4,6-dimethyl-m-xylylene dicarbamate,
2,5-dimethyl-p-xylylene dicarbamate,
2,4,6-trimethyl-m-xylylene dicarbamate,
2,4,5-trimethyl-m-xylylene dicarbamate, and
2,3,5,6-tetramethyl-m-xylylene dicarbamate.

This invention will now be described by referring to examples, but this invention is not limited by these examples.

EXAMPLE 1

A reaction vessel equipped with a stirrer, a thermometer, a fractionation column and a cooler was charged with 4,160 g (25 moles) of 4,6-dimethyl-m-xylylene glycol, 5350 g (60 moles) of ethyl carbamate and 18 liters of mixed xylylenes, which were heated above 100°C to remove as much water as possible. Then, 80 g of tetrabutyl titanate were added and the reaction was effected at 130°–140°C. Ethanol formed with the advance of the reaction was discharged from the top of the column. Since the resulting 4,6-dimethyl-m-xylylene dicarbamate is insoluble in mixed xylylenes, it was precipitated with the advance of the reaction. When the reaction was conducted for 3.5 hours at the above-mentioned temperature, about 2,850 cc of ethanol were removed. At this point the reaction was stopped. The reaction mixture was subjected to filtration while the temperature was above 100°C. In this way 5,930 g of 4,6-dimethyl-m-xylylene dicarbamate were obtained in a yield of 94.2 percent based on the starting xylylene glycol.

The so obtained product was in the form of white, cotton-like crystals melting at 198°C. The nitrogen analysis value was found to be 11.0 percent (calculated value = 11.1 percent).

After the so obtained dicarbamate was recrystallized from n-butanol, the melting point of the recrystallized product was measured as 198°C.

The filtrate obtained at the above filtration step contained small amounts of unchanged 4,6-dimethyl-m-xylylene glycol and intermediate 4,6-dimethyl-m-xylylene glycol monocarbamate, and it could be recycled and used in the next reaction.

EXAMPLE 2

The same reaction vessel as used in Example 1 was charged with 4,160 g (25 moles) of 4,6-dimethyl-m-xylylene glycol, 5,350 g (60 moles) of ethyl carbamate and, 18 liters of o-xylene and 150 g of aluminum isopropoxide. The reaction was effected at 140°–150°C. Ethanol formed with the progress of the reaction was discharged from the reaction system in the same manner as in Example 1. The reaction was continued for about 7 hours, and the reaction mixture underwent filtration while the temperature of the system was high. In this way 5,780 g of 4,6-dimethyl-m-xylylene dicarbamate was obtained in a yield of 91.8 percent based on the starting xylylene glycol. The melting point of the product was 198°C and the nitrogen analysis value was found to be 11.0 percent.

EXAMPLE 3

In the same reaction vessel as used in Example 1, 4,160 g (25 moles) of 2,5-dimethyl-p-xylylene glycol, 5,350 g (60 moles) of ethyl carbamate, 18 liters of m-xylylene and 100 g of tetra-iso-propyl titanate were allowed to react at 135°–140°C for 4 hours in the same manner as in Example 1. 2,5-Dimethyl-p-xylylene dicarbamate precipitated during the reaction was separated by filtration while the temperature of the reaction mixture was high. Some 5,800 g of pure 2,5-dimethyl-p-xylylene dicarbamate were obtained in the form of white, cotton-like crystals melting at 219°C. The yield was 92.2 percent based on the starting xylylene glycol and the nitrogen analysis value was found to be 11.1 percent (calculated value = 11.1 percent).

EXAMPLE 4

The same reaction vessel as used in Example 1 was charged with 4,160 g (25 moles) of 4,5-dimethyl-o-xylylene glycol, 4,500 g (60 moles) of methyl carbamate, 15 liters of ethyl benzene and 100 g of tetra-2-ethylhexyl titanate, and the reaction was conducted at 130°–140°C for 3.5 hours in the same manner as in Example 1. When the filtration of the reaction mixture was effected in the same manner as in Example 1, 5,550 g of pure 4,5-dimethyl-o-xylylene dicarbamate in the form of white, cotton-like crystals melting at 206°C were obtained in a yield of 88.2 percent based on the starting xylylene glycol. The nitrogen analysis value was found to be 10.9 percent (calculated value = 11.1 percent).

EXAMPLE 5

The same reaction vessel as used in Example 1 was charged with 3,450 g (25 moles) of m-xylylene glycol, 4,500 g (60 moles) of methyl carbamate, 10 liters of monochlorobenzene and 100 g of tetrabutyl titanate, and the reaction was carried out at 125°–130°C for 4,5 hours. After completion of the reaction the temperature of the reaction mixture was lowered at 80°C and at this temperature the filtration was effected to yield 5,140 g of white, powdery m-xylylene dicarbamate in a yield of 90.3 percent based on the starting xylylene glycol. The melting point of the product was 148°C and the nitrogen analysis value was found to be 12.4 percent (calculated value = 12.5 percent).

EXAMPLE 6

A reactor equipped with a stirrer, a thermometer, a cooler and a nitrogen-introducing tube was charged with 83.1 g (0.5 mole) of 2,5-dimethyl-p-xylylene glycol and 60 g (1.0 mole) of urea, which were allowed to react at 140°–145°C for 12 hours while passing nitrogen through the reactor. After completion of the reaction 150 ml of hot xylene were added to the reaction mixture, and the mixture was stirred sufficiently. Then, the precipitate was filtered off at elevated temperatures. The filtered residue was admixed with 200 ml of nitrobenzene and dissolved therein by heating at about 120°C. Then, the filtration was effected and the filtrate was allowed to cool to room temperature. The precipitated product was separated by filtration, washed with xylylene and dried. The obtained product having a melting point of 214°C was dissolved in 500 ml of hot dioxane and then water was added to the solution until no precipitation was observed in the mixed solution. The precipitated product was filtered out and dried. The resulting product had a melting point of 219°C, and the nitrogen analysis value was found be 11.3 percent (calculated value = 11.1 percent). Thus, it was confirmed that the product was 2,5-dimethyl-p-xylylene dicarbamate. The amount obtained of the product was 72.5 g which corresponded to 48 percent of the theoretical yield.

EXAMPLE 7

A 2-liter capacity reactor equipped with a stirrer, a thermometer, a cooler and a nitrogen-introducing tube was charged with 831 g (5 moles) of 4,6-dimethyl-m-xylylene glycol, 781 g (13 moles) of urea and 30 g of di-n-butyl tin laurate, and the reaction was carried out at 145°–150°C for 12 hours while feeding nitrogen gas into the reactor. Ammonia formed with the advance of the reaction was withdrawn from the top of the cooler. At the initial stage of the reaction the reactant mixture was in the uniform molten state, but with the advance of the reaction, 4,6-dimethyl-m-xylylene dicarbamate was precipitated in the reaction system. After completion of the reaction, 1 liter of hot toluene was added to the reaction mixture, and the unchanged starting xylylene glycol, intermediate xylylene glycol monocarbamate and the catalyst were dissolved therein, followed by filtration. The so separated product was admixed with 6 liters of nitrobenzene at about 130°C, followed by filtration. When the filtrate was cooled to room temperature, 4,6-dimethyl-m-xylylene dicarbamate was precipitated, which was then recovered by filtration, washed with toluene and dried. Some 880 g of 4,6-dimethyl-m-xylylene dicarbamate were obtained in a yield of 70 percent. The melting point of the product was 197°–198°C and the nitrogen analysis value was found to be 11.2 percent (calculated value = 11.1 percent).

EXAMPLE 8

The same reactor as used in Example 7 was charged with 249 g (1.5 moles) of 4,6-dimethyl-m-xylylene glycol, 234 g (3.9 moles) of urea, 10 g of di-n-butyl tin dilaurylmercaptide and 1.2 liters of 1,2,4-trichlorobenzene, and the reaction was effected at 145°–150°C for 12 hours while introducing nitrogen gas.

After completion of the reaction, the reaction mixture was cooled to room temperature and the precipitated product was separated by filtration. The product was added into 350 ml of hot toluene, and the unchanged glycol and intermediate monocarbamate were dissolved therein, followed by filtration. The residual product was dissolved in 2 liters of hot nitrobenzene and filtered. The filtrate was cooled to room temperature, and the precipitate was separated by filtration, washed with toluene and dried. Some 288 g of 4,6-dimethyl-m-xylylene dicarbamate melting at 197°–8C were obtained in a yield of 76 percent.

EXAMPLE 9

The same reactor as used in Example 7 was charged with 831 g (5 moles) of 2,5-dimethyl-p-xylylene glycol, 781 g (13 moles) of urea and 40 g of di-n-butyl tin laurylmercaptide, and the reaction was carried out at 145°–150°C for 11 hours while introducing nitrogen gas.

After completion of the reaction, post treatments were conducted in the same manner as in Example 7. Some 908 g of 2,5-dimethyl-p-xylylene dicarbamate were obtained in a yield of 72 percent. The melting point of the product was 219°C and the nitrogen analysis value was found to be 11.3 percent (calculated value = 11.1 percent).

EXAMPLE 10

The same reactor as used in Example 7 was charged with 831 g (5 moles) of 4,5-dimethyl-o-xylylene glycol, 781 g (13 moles) of area and 23 g of di-n-butyl tin dilaurate, and the reaction was conducted at 145°–150 °C for 14 hours while introducing nitrogen gas.

After completion of the reaction post-treatment were carried out in the same manner as in Example 7 to yield 895 g of 4,5-dimethyl-o-xylylene dicarbamate in a yield of 71 percent. The melting point of the product was 206°C and the nitrogen analysis value was found to be 10.9 percent (calculated value = 11.1 percent).

EXAMPLE 11

The same reactor as used in Example 7 was charged with 691 g (5 moles) of m-xylylene glycol, 660 g (11 moles) of urea and 40 g of di-n-butyl tin dilaurylmercaptide, and the reaction was conducted at 140–145°C for 12 hours.

After completion of the reaction post treatments were carried out in the same manner as in Example 7 to yield 830 g of m-xylylene dicarbamate in a yield of 74 percent. The melting point of the product was 147°–148°C and the nitrogen analysis value was found to be 12.6 percent (calculated value = 12.5 percent).

What we claim is:

1. A process for the preparation of xylylene dicarbamates of the formula

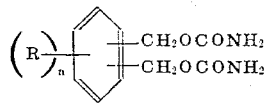

wherein R represents an alkyl group of one to for carbon atoms and $n$ is 0 or an integer of 1 to 4, which comprises reacting a xylylene glycol of the formula

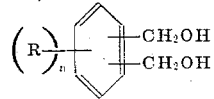

wherein R and $n$ are as defined above, with urea at a temperature of 135° to 160°C in the presence of a catalytic amount of a catalyst selected from carboxylic acid salts of zinc or lead, stannic or stannous chlorides, and organotin compounds of the formula $$A_mSnX_{(4-m)} \text{ or } A_2SnY$$

wherein A is an alkyl or alkoxy group, X is halogen, thioalkoxy or hydroxyl or a carboxylic residue, Y is O or S, and $m$ is 1, 2 or 3.

2. A process of claim 1 wherein said urea is used in at least the stoichiometric amount based on the xylylene glycol.

3. A process for the preparation of xylylene dicarbamates of the formula

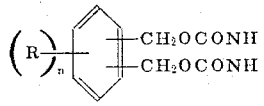

wherein R represents an alkyl group of 1 to 4 carbon atoms and $n$ is 0 or an integer of 1 to 4, which comprises reacting a xylylene glycol of the formula

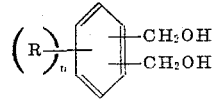

wherein R and $n$ are as defined above, with an ester of carbamic acid of the formula $$H_2NCOOR'$$

wherein R' represents an alkyl group of one to four carbon atoms, at a temperature of 120° to 180°C in the presence of a catalytic amount of an aluminum alkoxide or tetralkyl titanate.

4. A process of claim 3 wherein said ester of carbamic acid is used in at least the stoichiometric amount based on the xylylene glycol.

5. A process of claim 3 wherein the reaction of said xylylene glycol with said ester of carbamic acid is effected in the presence of a solvent selected from aromatic hydrocarbons having a boiling point higher than 115°C, chlorobenzene derivatives and alkoxybenzene derivatives.

6. A process for the preparation of xylylene dicarbamates of the formula

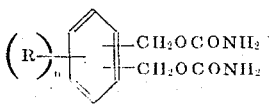

wherein R represents an alkyl group of one to four carbon atoms and $n$ is 0 or an integer of 1 to 4, which comprises reacting a xylylene glycol of the formula

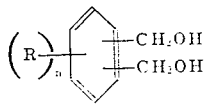

wherein R and n are as defined above, with at least a stoichiometric amount of urea based on said glycol at a temperature of 135° to 160°C; treating the resulting reaction product with an aromatic hydrocarbon of six to nine carbon atoms; treating the resulting residue with nitrobenzene to dissolve the resulting xylylene dicarbamate therein; and recovering the xylylene dicarbamate from the solution.

7. A xylylene dicarbamate of the formula

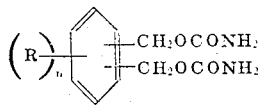

wherein R represents an alkyl group of one to four carbon atoms and $n$ is 0 or an integer of 1 to 4.

8. 4,6-Dimethyl-m-xylylene dicarbamate.
9. 2,5-Dimethyl-p-xylylene dicarbamate.
10. 4,5-Dimethyl-o-xylylene dicarbamate.
11. m-Xylylene dicarbamate.

* * * * *